Feb. 13, 1951   F. W. SAMPSON ET AL   2,541,297
METHOD OF FORMING DISH-SHAPED RESINOUS ARTICLES
Filed April 2, 1947   2 Sheets—Sheet 1

INVENTOR.
FREDERICK W. SAMPSON
BY AND PAUL A. NORRIS

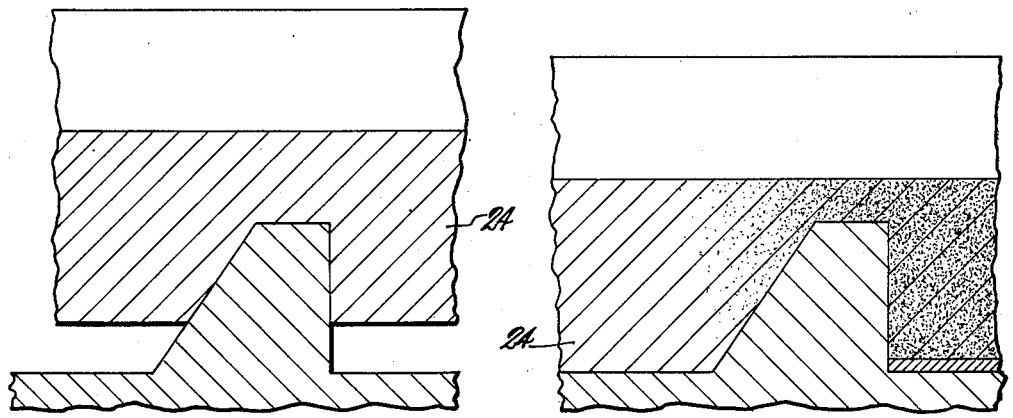
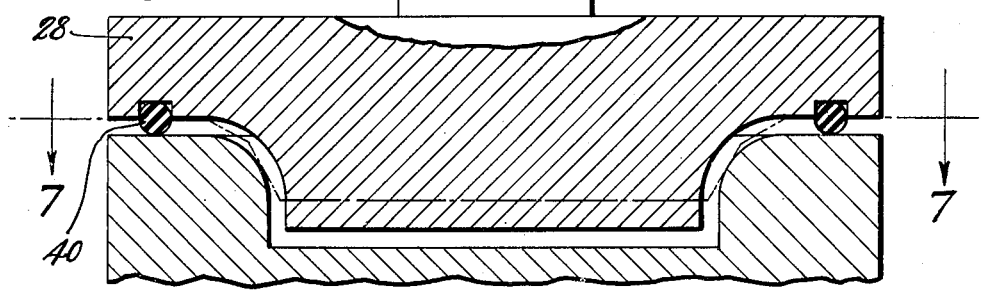
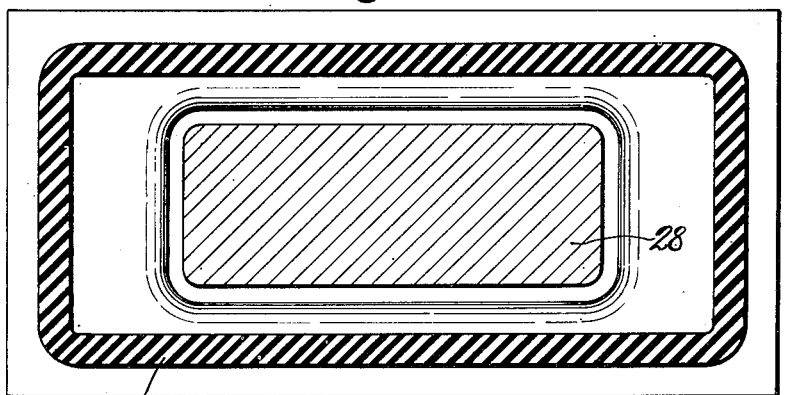

Patented Feb. 13, 1951

2,541,297

UNITED STATES PATENT OFFICE 2,541,297

METHOD OF FORMING DISH-SHAPED RESINOUS ARTICLES

Frederick W. Sampson and Paul A. Norris, Dayton, Ohio, assignors to General Motors Corporation, Detroit, Mich., a corporation of Delaware Application April 2, 1947, Serial No. 738,812

5 Claims. (Cl. 18—59)

1

This invention relates to molding procedures and is particularly concerned with molding large area articles that are substantially free from warpage.

It is, therefore, an object of the invention to provide a method for making large area molded articles wherein the article is of a generally dished shape which comprises, pouring the resin in liquid form into a mold cavity, placing a sheet of filler material on the resin, lowering the plunger section of the mold into place while maintaining the two sections of the mold at a temperature differential from one another, and finally compressing the resin within the mold while at a curing temperature, whereby the resin is cured and impregnated into the filler material while presenting a substantially continuous resinous film on the higher temperature side of the mold.

In carrying out the above object, it is a further object of the invention to maintain the resin in the mold by a sealing means disposed around the outer periphery of the mold.

A further object of the invention is to carry out the above method with the added step of trimming the sheet of filler material simultaneously with the sealing operation.

Further objects and advantages of the present invention will be apparent from the following description, reference being had to the accompanying drawings, wherein preferred embodiments of the present invention are clearly illustrated.

In the drawings:

Fig. 4 is an enlarged sectional fragmentary view showing the laminate partially sheared by the sealing lip.

Fig. 5 is an enlarged sectional fragmentary view showing the mold in closed position with the laminate practically sheared and the resin impregnated into the laminate.

Fig. 6 is a view in section of apparatus for carrying out another embodiment of the invention wherein a rubber sealing means is utilized and Fig. 7 is a view in section taken on line 7—7 of Fig. 6.

2

Figure 1:
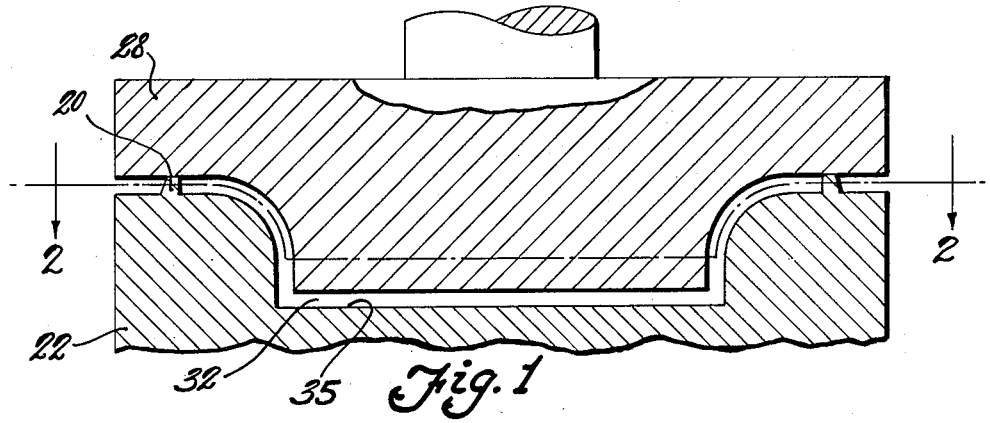
Fig. 1 is a view in section of one type of mold wherein a metal sealing and shearing lip is used.
Figure 2:
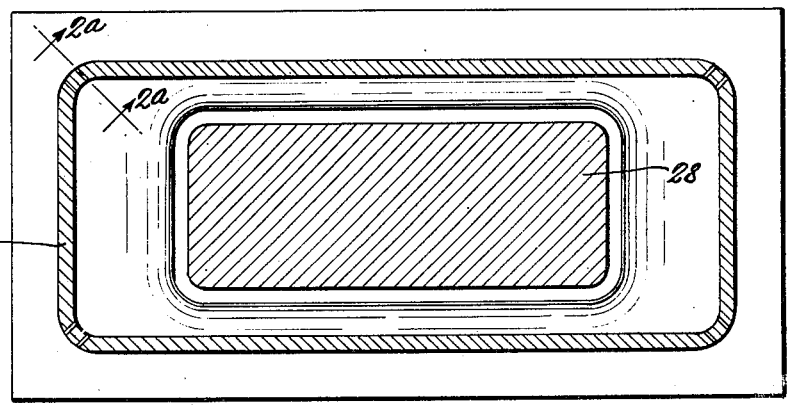
Fig. 2 is a section taken on line 2—2 of Fig. 1.
Figure 2A:
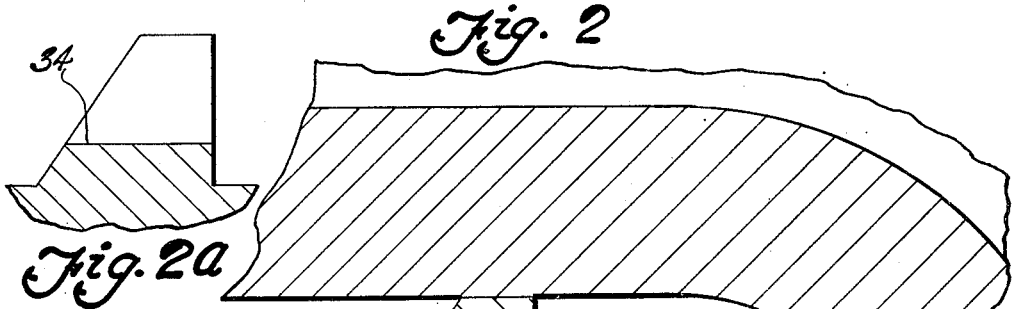
Fig. 2a is a fragmentary sectional view taken on line 2a—2a of Fig. 2.
Figure 3:
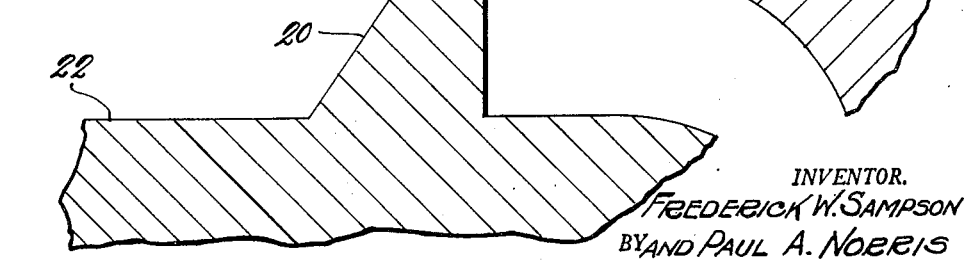
Fig. 3 is an enlarged sectional fragmentary view of the sealing and shearing lip construction showing the laminate in contact with the sealing lip.

In the manufacture of large area plastic articles having a dished shape, for example, a refrigerator door panel, much difficulty has been experienced in obtaining a satisfactory article wherein the outer surface of the panel has a substantially continuous plastic finish (a mold finish) and wherein the article is substantially free from warpage and cracks. In articles of this nature, it is desirable to utilize liquid plastic formed from a mixture of alkyd polyesters and polymerizable hydrocarbons, for example, vinylbenzene and the like which may be reacted during the molding operation. The reaction product, upon curing, goes through mechanical vulcanization, or cross bonding, which presents a very desirable material which is non-toxic, thermo-setting in character and easily cured. Also through the use of pigments, the plastic may be colored as desired. Obviously, if other articles are to be made, phenolics may be utilized in liquid form or for that matter any other polymerizable resinous material, such materials being well known in the art. Certain of these materials are disclosed at length in co-pending application Serial No. 654,779, assigned to the assignee of the present invention.

The problems occurring in the molding of large area dished shaped articles are created from a number of different factors. To begin with, it is desirable in most cases, to reinforce the article through the use of a sheet of fabric or sheeted glass fiber etc. In place of fabric, glass etc., fillers in the form of sheeted cellulosic material, sheeted cotton fiber, etc., for example, may be utilized, which sheeted stock takes up space in the mold and in the molded article and becomes impregnated with the resin. For ease of disclosure, any of these materials in sheet form will be termed laminate hereinafter. In this connection, it is apparent that other filler material, in comminuted form, may be used. In order to obtain desirable surface finish, the filler should be of a nodular or spherical shape if used in comminuted form so that only very small dimensional portions ever touch the mold surface that is used for the finish. In this manner, the finish appears continuous rather than interrupted.

In all cases when using a laminate, moisture is absorbed thereby. Upon curing, at atmospheric pressure, this moisture is emitted in the form of steam, which, if not removed properly from the mold, will cause a spotting of pock-marking of the surface of the article. Therefore it is desirable to maintain a certain degree of pressure above atmospheric within the mold to prevent the vaporization of the moisture, after the mold has been completely closed.

At the same time the resin, which has been poured into the mold, must be caused to flow upwardly around the periphery of the dished shape mold to form a uniform layer throughout the entire molding and around the periphery thereof. Some of this resin is preferably bled off in order to definitely determine that the mold is full.

We have found that when a laminate is used, that the two mold sections, that is the upper section or plunger and the lower section containing the cavity should be maintained at a differential in temperature, wherein the highest temperature portion will be the one which determines the smooth mold surface, due to the fact, that the resin will set-up to a slight degree at the higher temperature surface and form a thin layer or film of resin material. This gellation, or setting up is an important factor in obtaining satisfactory surfaces.

In order to obtain and maintain pressure within the mold, we provide a peripheral seal around the mold which may be carried, preferably by the lower mold section if the lower mold section is to be used for the finish. This seal may take the form of a sharp edged peripheral metal lip that acts as a sealing means against the paper and/or fabric (laminate), and when the mold is completely closed, simultaneously may act as a cutting means for trimming the paper and/or fabric (laminate). If it is not desired to trim the laminate, it is possible to provide a peripheral seal of a resilient material such as, natural rubber or synthetic rubber etc., which is fitted in either member so as to contact the other member and seal the space between the two members when the mold is in closed position.

The sealing of the space between the two mold members permits a pressure to be created during the curing of the resin in the mold which pressure varies with the temperature but in all cases is sufficient to prevent vaporization of moisture from the laminate and thereby prevent spotting of the molded surface.

In a preferred form of our invention we utilize a metal cutting lip 20 around the lower mold section 22 which is nothing more than a peripheral ridge having a substantially trapezoidal cross section. The lip 20 is of a height slightly less than the thickness of the laminate 24 to be used. In this connection, the laminate 24 is of an initial thickness dimension about the same as the desired thickness of the finished molding. In the process, we pour a predetermined quantity of resin in liquid form into the cavity 32 at the middle section thereof which resin flows outwardly to substantially cover the mold face 34. On this resin is laid a sheet of laminate material 24 and then the upper mold member 28 is lowered until a partial cutting of the laminate 24 occurs by the lip 20 as shown in Fig. 4. At this point, the laminate 24 will not be bottomed in the mold but will rest on the resin.

The mold members 22 and 28 are maintained at a differential in temperature preferably about 10° F. differential. For example, when alkyd polyester-polymerizable hydrocarbon mixtures are used, the upper mold member 28 is preferably maintained at 210 to 215° F., while the lower mold member is maintained at 220 to 225° F. This higher temperature on the lower mold member 22 causes a gellation of a thin film of plastic in direct contact therewith. Preferably the upper mold member 28 is held in its descent to permit a dwell for about 20 seconds in the position shown in Fig. 4 prior to actual closing of the mold. When this occurs, the laminate 24 is substantially sheared and is compressed to a thickness less than its original thickness in the mold due to the presence of the resin as shown in Fig. 5. During this closure, the resin that is not used up in impregnation into the laminate is bled off preferably through grooves 34 in the shearing lip 20, such grooves 34 being disposed at the corners of the mold, since these are the most difficult portions of the mold to obtain even dispersion of the resin. It is apparent that some bleeding of plastic occurs during the dwell and, therefore, the plastic to be charged into the mold should be slightly greater in quantity than that required for the finished article. After the mold is completely closed, the resin is maintained under pressure while the cure progresses for about 5 minutes whereupon mechanical vulcanization of the mixture is complete and the resin has taken on the property of a thermo-setting material.

It will be noted that since the laminate 24 rests on the resin that a continuous plastic surface is present adjacent the mold surface 35. The mold may be immediately opened and the panel removed from the hot mold whereupon the operation may be repeated.

When no shearing of the laminate 24 is desired, a rubber seal member 40 may be utilized as hereinbefore set forth. The action of the mold is the same, that is, the temperature of the mold members are the same and the mold is partially closed and permitted to dwell for a short period of time prior to complete closing and sealing of the mold. In each case, after the mold is sealed, substantially no resin escapes and the resin within the mold is held under pressure sufficient to prevent vaporization of the moisture which assures that the surface finish adjacent the higher temperature mold member 22 will be maintained uninterrupted by spots and breaks.

The temperature differential between the two mold members is quite important. It has been found that if the upper mold member is maintained at a higher temperature than the lower mold member, the resin will travel through the laminate whereupon the surface finish having desirable characteristics will be on the inside of the article. The temperature differential, therefore, is important in determination of the surface condition.

The temperatures set forth herein for mold operation may be varied, for example, from 200 to 250° F. with the proper differential maintained between the mold members. Obviously, if other resins are utilized, the curing temperatures must be varied to provide proper cure for the resins. All of these temperatures, however, are well known to those skilled in the art in accordance with the resin being utilized. As stated before, refrigerator door panels are preferably formed from the reaction products of alkyd polyesters and easily polymerizable hydro-carbon compounds. This reaction product preferably includes some fillers, for example, titanium dioxide which yields a desired white color. Inert fillers up to about 20% decrease the tendency toward shrinkage and are also desirable to use. These addition agents are described in the aforementioned copending application. Similarly, numerous alkyd polyesters and polymerizable hydrocarbons are described all of which are well known to the art. As stated before, other resins such as, phenolics in liquid form, poly-vinyl chloride, methylmethacrylate, urea resins and the like may all be used as a resin in accordance with the ultimate use of the article to be formed.

Thus, it is understood that the factors of prime importance herein reside in the use of a closed mold having two sections maintained at differential temperatures, together with a sealing means peripherally disposed around the mold cavity which becomes effective when the mold is completely closed to prevent vaporization of moisture through rise in pressure within the mold.

While the embodiments of the present invention as herein disclosed, constitute preferred forms, it is to be understood that other forms might be adopted, all coming within the scope of the claims which follow.

What is claimed is as follows:

1. In the method of forming large area dished shape articles from curable resin materials the steps of; providing a two-part mold comprising, an upper section and a lower section having a cavity therein, pouring a predetermined quantity of a liquid resin within said cavity, said quantity being in excess of that required to form the article, placing a sheet of laminate material over the cavity so that a portion thereof rests on said resin in said cavity, then partially closing the mold while controlling the temperature of the mold sections at a differential from one another, the temperature of at least one of said sections being sufficient to gel the resin maintaining the mold partially closed for a period of time sufficient to complete gellation of the resin adjacent the highest temperature mold section, then fully closing the mold and simultaneously bleeding off the excess liquid resin under pressure and finally completely curing the resin under pressure.

2. In the method of forming large area dished shape articles from curable resin materials, the steps of; providing a two-part mold comprising, an upper section and a lower section having a cavity therein, pouring a predetermined quantity of a liquid resin within the cavity said quantity being in excess of the quantity required to form the article, placing a sheet of laminate material over the cavity so that a portion thereof rests on said resin in said cavity, partially closing the mold while controlling the temperature of the two mold sections at a differential from one another, the temperature of at least one of said sections being sufficient to gel the resin maintaining the mold partially closed for a period of time sufficient to complete gellation of the resin adjacent the highest temperature mold section, and then fully closing the mold bleeding off the excess liquid resin and finally completing the cure.

3. In the method of forming large area articles from curable resin materials, the steps of; providing a two-part mold comprising, an upper and lower section wherein the lower section has a cavity therein, pouring a predetermined quantity of liquid resin into said cavity said quantity being in excess of that required to form the article, placing a sheet of laminate over the cavity so that a portion thereof rests on said resin in said cavity, closing and partially sealing the mold and contents, heating the same to a differential temperature wherein the lower mold section is maintained at a higher temperature than the upper mold section, said higher temperature being sufficient to gel the resin whereby a thin layer of resin is maintained between the laminate and the lower mold section and the remainder of the resin impregnates the laminate, simultaneously bleeding the excess liquid resin from the mold cavity, continuing heating until a complete reaction is obtained in the resin and finally removing the article from the mold.

4. A method of forming large area articles from a curable resin material, the steps of; providing a two-part mold comprising an upper and a lower section wherein the lower section has a cavity therein and includes shearing means around the periphery of said cavity, pouring a predetermined quantity of reactable liquid resin into said cavity said quantity being in excess of that required to form the article, placing a sheet of laminate material over the cavity so that a portion thereof rests on said resin in said cavity, at least partially shearing the laminate to the desired size by closing the mold, simultaneously bleeding off the excess liquid resin, and finally completely reacting the resin within the closed mold by heating of the mold.

5. The method as claimed in claim 4 wherein the shearing step simultaneously seals the contents of the mold.

FREDERICK W. SAMPSON.
PAUL A. NORRIS.

REFERENCES CITED

The following references are of record in the file of this patent:

UNITED STATES PATENTS

| Number | Name | Date |
| --- | --- | --- |
| 1,301,069 | McDonald | Apr. 15, 1919 |
| 1,310,442 | Roberts | July 22, 1919 |
| 1,524,335 | Brown | Jan. 27, 1925 |
| 2,042,210 | Clay | May 26, 1936 |
| 2,351,475 | Berger | June 13, 1944 |
| 2,417,510 | McGinnis | Mar. 18, 1947 |